Patented July 12, 1932

1,867,274

UNITED STATES PATENT OFFICE

RICHARD H. F. MANSKE, OF NEW HAVEN, CONNECTICUT, ASSIGNOR TO ELI LILLY AND COMPANY, OF INDIANAPOLIS, INDIANA, A CORPORATION OF INDIANA

RESOLUTION OF EPHEDRINE AND ITS HOMOLOGUES AND OF MANDELIC ACID, AND CERTAIN INTERMEDIATES

No Drawing.    Application filed November 20, 1929.  Serial No. 408,675.

In the synthesis of ephedrine, the initial synthetic product is an inactive or racemic mixture of d-ephedrine, l-ephedrine, d-pseudo-ephedrine, and l-pseudo-ephedrine. The racemic mixture of d-ephedrine and l-ephedrine is readily separable from the racemic mixture of d-pseudo-ephedrine and l-pseudo-ephedrine, by known processes. The d-ephedrine and the l-ephedrine, however, are not so readily separable from each other; and my invention in its main phase is concerned with that separation or resolution, to obtain the physiologically active l-ephedrine.

The same general situation exists in the synthesis of those close homologues of ephedrine where either (or both) of the two methyl groups thereof is substituted by hydrogen or by an ethyl group. Ephedrine and these close homologues may be represented by the formula:

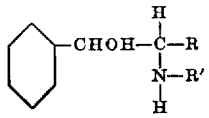

where R and R' each equal $H(CH_2)_x$ and $x$ in either radical equals an integer between zero and 2 inclusive.

In the same way, in the synthesis of mandelic acid, the initial synthetic product is an inactive or racemic mixture of d-mandelic acid and l-mandelic acid. While this racemic mixture is separable by known processes, one branch of the present invention relates to an improved process of obtaining such separation or resolution.

I have found that certain new salts are formed by the combination of ephedrine (or its close homologues) and mandelic acid. These are ephedrine-mandelates. I have also found that the salts formed by the combination of an ephedrine (or one of its close homologues) and a mandelic acid which are optically active with the same sign are far less soluble in concentrated alcohol than are those formed by the combination of an ephedrine (or one of its close homologues) and a mandelic acid which are optically active with opposite signs. That is, for example, the d-ephedrine-d-mandelate and the l-ephedrine-l-mandelate are far less soluble in 95% alcohol, for instance, than are either the d-ephedrine-l-mandelate or the l-ephedrine-d-mandelate.

By the word "sign" as used in the preceding paragraph and elsewhere in the specification and claims, I refer to the direction of optical rotation.

By the use of this discovery, it is possible to obtain more readily than heretofore, and with relatively higher yields, a resolution of either racemic ephedrine (or its close homologues) or racemic mandelic acid.

In obtaining such a resolution, one of those two compounds in racemic form, whose resolution is desired, is treated in alcohol solution with an optically active form of the second of said two compounds; this second compound will be called the precipitating compound. This will produce a precipitate which is largely an ephedrine-mandelate with the base and acid radicals of such salt of a like sign with the optically active compound that was separately added. The precipitate thus formed is purified by recrystallization from alcohol solution.

The mother liquor from which the first precipitation was obtained may now be treated with an optically active form of the precipitating compound but with the optical activity of the opposite sign from that of the precipitating compound used in the first treatment. This gives a precipitate of ephedrine-mandelate with both the acid and the base radicals thereof mainly of the same sign as that of the substance last added. This precipitate may also be purified by recrystallization from alcohol.

The yield may be increased by further treatments of the mother liquor alternately with the precipitating substance of opposite signs.

This will perhaps be clear from the following examples:

*The resolution of racemic or dl-ephedrine*

A mixture of 13.8 g. of dl-ephedrine and 7.7 g. of d-mandelic acid is dissolved in 30 cc. of hot 95% alcohol. The amount of mandelic acid used is desirably slightly more than half, desirably about 60%, of the amount which would be the molecular equivalent of the total amount of ephedrine, so that there will be an excess of d-mandelic acid beyond what is required for combining with the d-ephedrine. On cooling, the new product d-ephedrine-d-mandelate crystallizes out, in fair purity. This precipitate is purified by one or more recrystallizations from a small volume of alcohol, each recrystallization being obtained by dissolving the precipitate in hot alcohol and permitting the alcohol to cool, desirably with some evaporation. After two such recrystallizations, the product, d-ephedrine-d-mandelate, consists of colorless, rhombic plates, melting at 170° C., with previous sintering at 167° C.

The salt thus obtained is made alkaline, as with a solution of sodium or potassium hydroxide, and the free d-ephedrine base is extracted by ether. The ethereal solution of d-ephedrine is evaporated to a small volume, and treated with alcoholic hydrogen chloride, to produce d-ephedrine hydrochloride. The d-ephedrine hydrochloride thus obtained melts at 218° to 218.5° C., and has $[\alpha]_D^{25} + 35.6°$ in 2% aqueous solution.

The mother liquor from the first precipitation, now containing an excess of l-ephedrine in comparison with the d-ephedrine, is now treated with a base, such as potassium hydroxide, in slight excess, to form potassium d-mandelate with any d-mandelic acid remaining. Then the potassium d-mandelate so produced is gotten rid of by extracting the solution with ether, in which the ephedrine dissolves while the potassium d-mandelate does not. The ether solution thus obtained of the ephedrine is evaporated to remove the ether, and hot alcohol is added to bring the volume again to about 30 cc. This alcoholic solution, which now contains all of the original ephedrine that had not been precipitated on the first precipitation, so that such remaining ephedrine is mainly l-ephedrine, is now treated with 7.7 g. of l-mandelic acid. As before, this is slightly in excess of the molecular equivalent amount that will be necessary to neutralize the like-signed ephedrine present. On cooling, and standing, the new product l-ephedrine-l-mandelate crystallizes out. This l—l salt is purified by recrystallization in the same way that the d—d salt previously obtained was purified; and its hydrochloride is obtained similarly. This hydrochloride is l-ephedrine-hydrochloride, and melts at 218 to 218.5° C. and has a $[\alpha]_D^{25} - 35.5°$ in 2% aqueous solution. This l-ephedrine-hydrochloride is found to be substantially identical with a purified specimen of the hydrochloride of ephedrine obtained from the plant Ma Huang; as indicated further by the fact that the melting point of a mixture of it with such a specimen from Ma Huang is found to be the same as that of either component of such mixture.

It is now possible to obtain further amounts, alternatively of the d-ephedrine and of the l-ephedrine, from the mother liquor, by repeating the process of mandelate crystallizations by alternate treatments with d-mandelic acid and l-mandelic acid.

After the first separation from the mother liquor of the d-ephedrine-d-mandelate, it is possible to obtain some l-ephedrine by evaporation of the mother liquor. This l-ephedrine is not so pure as that obtained in the manner above described, and its hydrochloride after several recrystallizations from alcohol is found to have a melting point of about 216° C.

In the foregoing example, the alternate treatments with mandelic acid of different signs began with a treatment by d-mandelic acid. However, the alternate treatments may equally well start with a treatment by l-mandelic acid.

The same process of resolution just described for racemic ephedrine may be used for resolving the aforesaid homologues of ephedrine in racemic form.

*The resolution of racemic or dl-mandelic acid*

A mixture of 12 g. of dl-mandelic acid and 12 g. of l-ephedrine is dissolved in 40 cc. of hot 95% alcohol. The amount of l-ephedrine used is desirably slightly more than half, desirably about 60%, of the amount which would be the molecular equivalent of the total amount of mandelic acid, so that there will be an excess of l-ephedrine beyond what is required for combining with the l-mandelic acid. The l-ephedrine and the l-mandelic acid combine to form the new product l-ephedrine-l-mandelate, (above described), which crystallizes out upon cooling. The crystals thus obtained are purified by recrystallization from alcohol, as before. Two recrystallizations are found to produce a substantially pure salt. The salt thus obtained is acidified, as by hydrochloric acid. The resultant l-mandelic acid thus freed is extracted by ether, leaving the ephedrine hydrochloride behind; and allowed to crystallize, desirable by removing the ether by evaporation, taking up the residue in acetone, and then permitting spontaneous evaporation of the acetone. The crystalline mandelic acid thus obtained is l-mandelic acid, melts at 133.5° C., and has $[\alpha]_D^{25} - 156.9°$ in 2% aqueous solution.

The mother liquor from the first precipitation by the addition of l-ephedrine to the dl-mandelic acid, which mother liquor now contains an excess of d-mandelic acid in comparison with the l-mandelic acid, is now treated with an acid, such as hydrochloric acid, in slight excess, to form l-ephedrine hydrochloride with any l-ephedrine remaining. The solution is now extracted with ether, which dissolves the mandelic acid remaining but does not dissolve the ephedrine salt of the added acid. The ether extract thus obtained is evaporated, to get rid of the ether, and alcohol is added to bring the volume of the solution back to about 40 cc. Then the precipitation is repeated as before, using d-ephedrine instead of the l-ephedrine previously used; 12 g. of the ephedrine being added, as before. On cooling, and standing, a precipitate forms consisting mainly of the new product d-ephedrine-d-mandelate, above described. This crystalline precipitate is purified by recrystallization from alcoholic solution, in the manner already described; and the optically active mandelic acid, which this time is d-mandelic acid, is obtained by the same processes of acidification, ether extraction, and crystallization by spontaneous evaporation of an acetone solution, as already described for l-mandelic acid. The d-mandelic acid thus obtained melts at about 133.5° C., and has $[\alpha]_D^{20} + 156.9°$ in 2% 2% aqueous solution.

By further alternate treatments of the mother liquor with l-ephedrine and d-ephedrine, further yields may be obtained in the same way of the two optically active mandelic acids.

After the first separation from the mother liquor of the l-ephedrine-l-mandelate, it is possible to obtain some d-mandelic acid by evaporation of the mother liquor. This d-mandelic acid is not so pure as that obtained in the manner above described, and after several recrystallizations from water is found to have a melting point of about 132° C.

In the foregoing example, the alternate treatments with ephedrine of different signs began with a treatment by l-ephedrine. However, the alternate treatments may equally well start with a treatment by d-ephedrine.

I claim as my invention:

1. The process of resolving a racemic mixture, comprising causing a reaction in alcoholic solution between a mandelic acid and a compound having the formula:

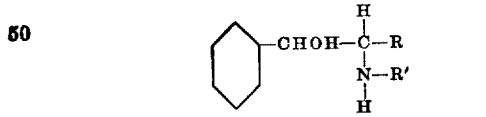

where R and R' each equal $H(CH_2)_x$ and $x$ in either radical equals an integer between zero and 2 inclusive, with one of said two substances in racemic form and the other in optically active form, to produce an ephedrine-mandelate of which the major portion has both its acid part and its base part of the same sign as that of the optically active initial substance.

2. The process of resolving a racemic mixture, comprising causing a reaction in alcoholic solution between a mandelic acid and a compound having the formula:

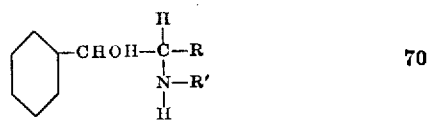

where R and R' each equal $H(CH_2)_x$ and $x$ in either radical equals an integer between zero and 2 inclusive, with one of said two substances in racemic form and the other in optically active form, to produce an ephedrine-mandelate of which the major portion has both its acid part and its base part of the same sign as that of the optically active initial substance, separating said ephedrine-mandelate from the solution, and treating the ephedrine-mandelate to remove therefrom that part thereof derived from the initial substance that was in optically active form and thus to obtain an optically active form of the initial substance that was in racemic form.

3. The process of resolving a racemic mixture, comprising causing a reaction in alcoholic solution between a mandelic acid and an ephedrine, with one of said two substances in racemic form and the other in optically active form, to produce an ephedrine-mandelate of which the major portion has both its acid part and its base part of the same sign as that of the optically active initial substance.

4. The process of resolving a racemic mixture, comprising causing a reaction in alcoholic solution between a mandelic acid and an ephedrine, with one of said two substances in racemic form and the other in optically active form, to produce an ephedrine-mandelate of which the major portion has both its acid part and its base part of the same sign as that of the optically active initial substance, separating said ephedrine-mandelate from the solution, and treating the ephedrine-mandelate to remove therefrom that part thereof derived from the initial substance that was in optically active form and thus to obtain an optically active form of the initial substance that was in racemic form.

5. The process of resolving a racemic mixture, comprising causing a reaction in alcoholic solution between a mandelic acid and a compound having the formula:

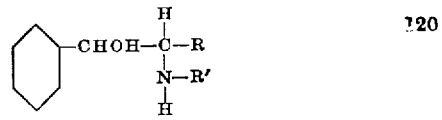

where R and R' each equal $H(CH_2)_x$ and $x$ in either radical equals an integer between zero and 2 inclusive, with one of said two substances in racemic form and the other in optically form, to produce an ephedrine-mandelate of which the major portion has both its acid part and its base part of the same sign as that of the optically active initial substance, separating the ephedrine-mandelate thus obtained from the mother liquor, adding a third reagent that combines and forms a salt with any of the initial substance which was in optically active form that remains in the mother liquor, extracting the thus-treated mother liquor with ether to obtain an ether solution of the portion remaining therein of the initial substance that was in racemic form, evaporating to remove the ether and adding alcohol, and then treating such alcohol solution with more of the initial substance that was in optically active form but this time with such initial substance in an optically active form of opposite sign from that first used, to produce an ephedrine-mandelate of which the major portion has both its acid part and its base part of the same sign as that of the optically active substance that was used in the second treatment.

6. The process of resolving a racemic mixture, comprising causing a reaction in alcoholic solution between a mandelic acid and a compound having the formula:

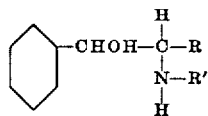

where R and R' each equal $H(CH_2)_x$ and $x$ in either radical equals an integer between zero and 2 inclusive, with one of said two substances in racemic form and the other in optically active form, to produce an ephedrine-mandelate of which the major portion has both its acid part and its base part of the same sign as that of the optically active initial substance, separating the ephedrine-mandelate thus obtained from the mother liquor, and treating in alcoholic solution the remainder of the substance that was in racemic form with more of the initial substance that was in optically active form but this time with such initial substance in an optically active form of opposite sign from that first used, to produce an ephedrine-mandelate of which the major portion has both its acid part and its base part of the same sign as that of the optically active substance that was used in the second treatment.

7. The process of resolving a racemic mixture, comprising causing a reaction in alcohol solution between a mandelic acid and an ephedrine, with one of said two substances in racemic form and the other in optically active form, to produce an ephedrine-mandelate of which the major portion has both its acid part and its base part of the same sign as that of the optically active initial substance, separating the ephedrine-mandelate thus obtained from the mother liquor, adding a third reagent that combines and forms a salt with any of the initial substance which was in optically active form that remains in the mother liquor, extracting the thus-treated mother liquor with ether to obtain an ether solution of the portion remaining therein of the initial substance that was a racemic form, evaporating to remove the ether and adding alcohol, and then treating such alcohol solution with more of the initial substance that was in optically active form but this time with such initial substance in an optically active form of opposite sign from that first used, to produce an ephedrine-mandelate of which the major portion has both its acid part and its base part of the same sign as that of the optically active substance that was used in the second treatment.

8. The process of resolving a racemic mixture, comprising causing a reaction in alcoholic solution between a mandelic acid and an ephedrine, with one of said two substances in racemic form and the other in optically active form, to produce an ephedrine-mandelate of which the major portion has both its acid part and its base part of the same sign as that of the optically active initial substance, separating the ephedrine-mandelate thus obtained from the mother liquor, and treating in alcoholic solution the remainder of the substance that was in racemic form with more of the initial substance that was in optically active form but this time with such initial substance in an optically active form of opposite sign from that first used, to produce an ephedrine-mandelate of which the major portion has both its acid part and its base part of the same sign as that of the optically active substance that was used in the second treatment.

9. The process of resolving racemic ephedrine, comprising treating such racemic ephedrine in alcoholic solution with mandelic acid in optically active form, to produce an ephedrine-mandelate of which the major portion has both its acid part and its base part of the same sign as that of the mandelic acid used.

10. The process of resolving racemic ephedrine, comprising treating such racemic ephedrine in alcoholic solution with mandelic acid in optically active form, to produce an ephedrine-mandelate of which the major portion has both its acid part and its base part of the same sign as that of the mandelic acid used, separating said ephedrine-mandelate from the solution, and treating the ephedrine-mandelate with a base to produce a mandelate of said base and thus to free the ephedrine in an optically active form of the same sign as that of the initial mandelic acid used.

11. The process of resolving racemic ephedrine, comprising treating such racemic ephedrine in alcoholic solution with mandelic acid in optically active form, to produce an ephedrine-mandelate of which the major portion has both its acid part and its base part of the same sign as that of the mandelic acid used, separating the ephedrine-mandelate thus obtained from the mother liquor, adding a base to form a salt with any of the initial mandelic acid that remains in the mother liquor, extracting the thus-treated mother liquor with ether to obtain an ether solution of the ephedrine remaining therein, evaporating to remove the ether and adding alcohol, and then treating such alcohol solution with more mandelic acid in optically active form but this time with the mandelic acid in an optically active form of opposite sign from that first used, to produce an ephedrine-mandelate of which the major portion has both its acid part and its base part of the same sign as that of the mandelic acid which was used in the second treatment.

12. The process of resolving racemic ephedrine, comprising treating such racemic ephedrine in alcoholic solution with mandelic acid in optically active form, to produce an ephedrine-mandelate of which the major portion has both its acid part and its base part of the same sign as that of the mandelic acid used, separating the ephedrine-mandelate thus obtained from the mother liquor, and treating in alcoholic solution the remainder of the original ephedrine with more mandelic acid in optically active form but this time with the mandelic acid in an optically active form of opposite sign from that first used, to produce an ephedrine-mandelate of which the major portion has both its acid part and its base part of the same sign as that of the mandelic acid which was used in the second treatment.

13. The process of resolving racemic ephedrine, comprising treating such racemic ephedrine in alcoholic solution with d-mandelic acid, to produce a d-ephedrine-d-mandelate, separating the d-ephedrine-d-mandelate thus obtained from the mother liquor, adding a base to form a salt with any of the initial d-mandelic acid that remains in the mother liquor, extracting the thus-treated mother liquor with ether to obtain an ether solution of the ephedrine remaining therein, evaporating to remove the ether and adding alcohol, and then treating such alcohol solution with l-mandelic acid, to produce an l-ephedrine-l-mandelate.

14. The process of resolving racemic ephedrine, comprising treating such racemic ephedrine in alcoholic solution with d-mandelic acid, to produce a d-ephedrine-d-mandelate, separating the d-ephedrine-d-mandelate thus obtained from the mother liquor, and treating in alcoholic solution the remainder of the original ephedrine with l-mandelic acid, to produce an l-ephedrine-l-mandelate.

15. An ephedrine-mandelate.

16. An ephedrine-mandelate in which both the ephedrine part and the mandelic-acid part are of like sign from the standpoint of optical activity.

17. l-Ephedrine-l-mandelate.

18. d-Ephedrine-d-mandelate.

19. The process of resolving racemic ephedrine, comprising treating such racemic ephedrine in alcoholic solution with l-mandelic acid, to produce an l-ephedrine-l-mandelate, separating the l-ephedrine-l-mandelate thus obtained from the mother liquor, adding a base to form a salt with any of the initial l-mandelic acid that remains in the mother liquor, extracting the thus-treated mother liquor with ether to obtain an ether solution of the ephedrine remaining therein, evaporating to remove the ether and adding alcohol, and then treating such alcohol solution with d-mandelic acid, to produce a d-ephedrine-d-mandelate.

20. The process of resolving racemic ephedrine, comprising treating such racemic ephedrine in alcoholic solution with l-mandelic acid, to produce an l-ephedrine-l-mandelate, separating the l-ephedrine-l-mandelate thus obtained from the mother liquor, and treating in alcoholic solution the remainder of the original ephedrine with d-mandelic acid, to produce a d-ephedrine-d-mandelate.

21. The process of resolving racemic mandelic acid, comprising treating such racemic mandelic acid in alcoholic solution with an ephedrine in optically active form, to produce an ephedrine-mandelate of which the major portion has both its acid part and its base part of the same sign as that of the ephedrine used.

22. The process of resolving racemic mandelic acid, comprising treating such racemic mandelic acid in alcoholic solution with an ephedrine in optically active form, to produce an ephedrine-mandelate of which the major portion has both its acid part and its base part of the same sign as that of the ephedrine used, separating said ephedrine-mandelate from the solution, and treating the ephedrine-mandelate with a base to produce a mandelate of the same sign as that of the initial ephedrine used and to free it of the ephedrine.

23. The process of resolving racemic mandelic acid, comprising treating such racemic mandelic acid in alcoholic solution with an ephedrine in optically active form, to produce an ephedrine-mandelate of which the major portion has both its acid part and its base part of the same sign as that of the ephedrine used, separating the ephedrine-mandelate thus obtained from the mother liquor, adding an acid to form a salt with any of the initial ephedrine which remains in the mother liquor, extracting the thus-treated mother liquor with ether to obtain an ether solution of the mandelic acid remaining therein, evaporating to remove the ether and adding alcohol, and then treating such alcohol solution with more ephedrine in optically active form but this time with the ephedrine in an optically active form of opposite sign from that first used, to produce an ephedrine-mandelate of which the major portion has both its acid part and its base part of the same sign as that of the ephedrine which was used in the second treatment.

24. The process of resolving racemic mandelic acid, comprising treating such racemic mandelic acid in alcoholic solution with an ephedrine in optically active form, to produce an ephedrine-mandelate of which the major portion has both its acid part and its base part of the same sign as that of the ephedrine used, separating the ephedrine-mandelate thus obtained from the mother liquor, and treating in alcoholic solution the remainder of the original mandelic acid with more ephedrine in optically active form but this time with the ephedrine in an optically active form of opposite sign from that first used, to produce an ephedrine-mandelate of which the major portion has both its acid parts and its base part of the same sign as that of the ephedrine which was used in the second treatment.

In witness whereof, I have hereunto set my hand at New Haven, Connecticut, this 12th day of November, A. D. one thousand nine hundred and twenty nine.

RICHARD H. F. MANSKE.

CERTIFICATE OF CORRECTION.

Patent No. 1,867,274.  July 12, 1932.

RICHARD H. F. MANSKE.

It is hereby certified that error appears in the printed specification of the above numbered patent requiring correction as follows: Page 2, line 115, for "desirable" read desirably; page 3, line 24, strike out the character "2%", and line 128, claim 5, after "optically" insert the word active; page 4, line 53, claim 7, for "alcohol" read alcoholic, and line 69, for the article "a" read in; and that the said Letters Patent should be read with these corrections therein that the same may conform to the record of the case in the Patent Office.

Signed and sealed this 18th day of October, A. D. 1932.

(Seal)

M. J. Moore,
Acting Commissioner of Patents.

more ephedrine in optically active form but this time with the ephedrine in an optically active form of opposite sign from that first used, to produce an ephedrine-mandelate of which the major portion has both its acid part and its base part of the same sign as that of the ephedrine which was used in the second treatment.

24. The process of resolving racemic mandelic acid, comprising treating such racemic mandelic acid in alcoholic solution with an ephedrine in optically active form, to produce an ephedrine-mandelate of which the major portion has both its acid part and its base part of the same sign as that of the ephedrine used, separating the ephedrine-mandelate thus obtained from the mother liquor, and treating in alcoholic solution the remainder of the original mandelic acid with more ephedrine in optically active form but this time with the ephedrine in an optically active form of opposite sign from that first used, to produce an ephedrine-mandelate of which the major portion has both its acid parts and its base part of the same sign as that of the ephedrine which was used in the second treatment.

In witness whereof, I have hereunto set my hand at New Haven, Connecticut, this 12th day of November, A. D. one thousand nine hundred and twenty nine.

RICHARD H. F. MANSKE.

CERTIFICATE OF CORRECTION.

Patent No. 1,867,274.             July 12, 1932.

RICHARD H. F. MANSKE.

It is hereby certified that error appears in the printed specification of the above numbered patent requiring correction as follows: Page 2, line 115, for "desirable" read desirably; page 3, line 24, strike out the character "2%", and line 128, claim 5, after "optically" insert the word active; page 4, line 53, claim 7, for "alcohol" read alcoholic, and line 69, for the article "a" read in; and that the said Letters Patent should be read with these corrections therein that the same may conform to the record of the case in the Patent Office.

Signed and sealed this 18th day of October, A. D. 1932.

(Seal)             M. J. Moore,
Acting Commissioner of Patents.

CERTIFICATE OF CORRECTION.

Patent No. 1,867,274.                                                             July 12, 1932.

RICHARD H. F. MANSKE.

It is hereby certified that error appears in the printed specification of the above numbered patent requiring correction as follows: Page 2, line 115, for "desirable" read desirably; page 3, line 24, strike out the character "2%", and line 128, claim 5, after "optically" insert the word active; page 4, line 53, claim 7, for "alcohol" read alcoholic, and line 69, for the article "a" read in; and that the said Letters Patent should be read with these corrections therein that the same may conform to the record of the case in the Patent Office.

Signed and sealed this 18th day of October, A. D. 1932.

(Seal)                                                  M. J. Moore,
                                                       Acting Commissioner of Patents.